United States Patent [19]
Webber et al.

[11] Patent Number: 4,494,446
[45] Date of Patent: Jan. 22, 1985

[54] POWER ASSISTED STEERING GEAR

[75] Inventors: Gordon E. G. Webber; Alan G. Wilson, both of Bristol, England

[73] Assignee: Cam Gears Limited, Hertfordshire, England

[21] Appl. No.: 496,942

[22] Filed: May 23, 1983

[30] Foreign Application Priority Data

Jun. 18, 1982 [GB] United Kingdom ............ 8217633

[51] Int. Cl.³ .......................................... F15B 13/16
[52] U.S. Cl. .................................. 91/375 A; 180/148
[58] Field of Search ................ 91/375 A, 375 R; 137/625.24; 180/148, 147, 146

[56] References Cited

U.S. PATENT DOCUMENTS

| | | | |
|---|---|---|---|
| 3,930,554 | 1/1976 | Ward | 91/375 A |
| 4,178,835 | 12/1979 | Millard | 91/375 A |
| 4,294,325 | 10/1981 | Nomura | 91/375 A |
| 4,378,030 | 3/1983 | Duffy | 91/375 A |

FOREIGN PATENT DOCUMENTS 2043566A 8/1980 United Kingdom .

Primary Examiner—Paul E. Maslousky
Attorney, Agent, or Firm—Yount & Tarolli

[57] ABSTRACT

A power assisted steering gear has a toothed part 1 such as a pinion coupled through a torque responsive rod 12 to an input shaft 4 so that rotation of the shaft 4 rotates the pinion 1 to drive an output member having a servo motor associated therewith. Fluid flow to the servo motor for power assistance is controlled by a valve 6 by displacement of component parts of the valve during relative rotation between the input shaft 4 and the pinion 1 as permitted by the rod 12.

The toothed part 1 is rotatably borne in the housing by a bearing 16 which journals a shaft part 19 formed by an extension of the rod 12 through the toothed part 1.

The valve 6 and pinion 1 may form a unified assembly 7 carried on the shaft 4 and which is inserted into and removed from the housing 3 in unit manner.

13 Claims, 1 Drawing Figure

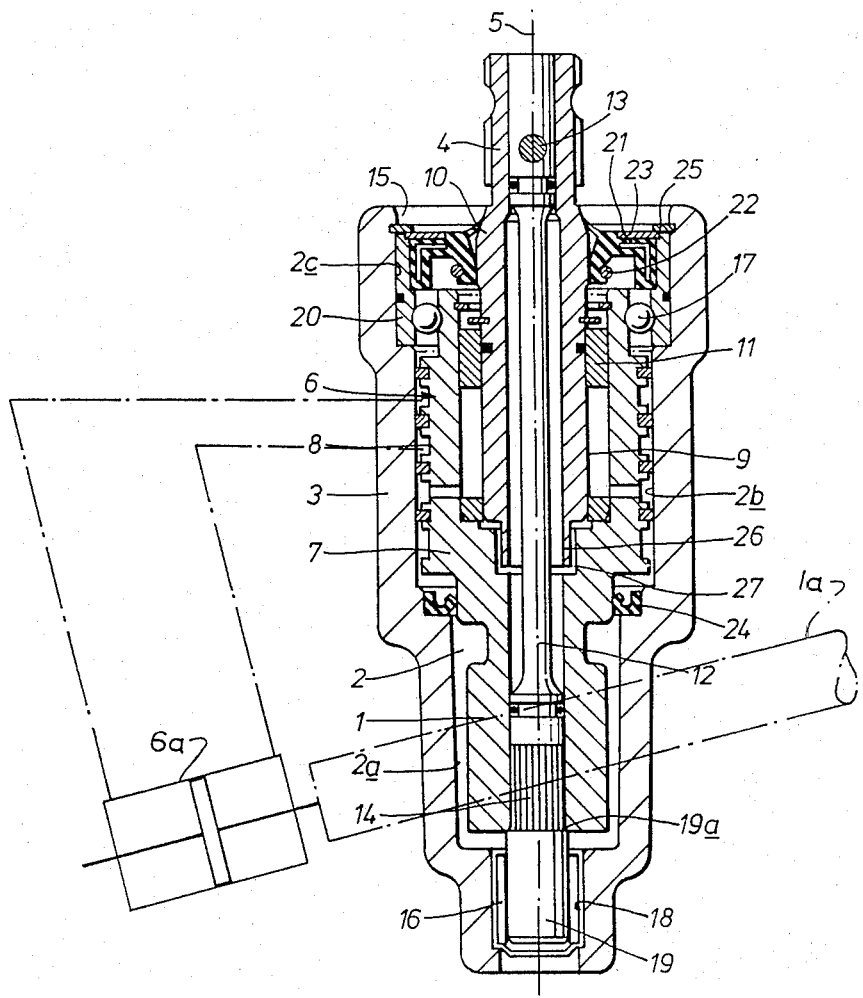

POWER ASSISTED STEERING GEAR

TECHNICAL FIELD AND BACKGROUND ART

This invention relates to a power assisted steering gear and is particularly concerned with such a gear having a toothed part which is coupled by a rod to an axially extending input shaft and which is rotatably mounted for driving an output member in response to rotation of the input shaft about its axis. In such a gear the toothed part is usually in the form of a pinion or worm rotation of which, by rotation of the input shaft and through the rod, drives a toothed rack member or toothed sector member which comprises, or is coupled to, the output member. Conventionally a servo motor is associated with the output member to provide power assistance to displacement of that member and the flow of fluid under pressure to the servo motor is controlled by a valve which reacts between the toothed part and the input shaft and is responsive to rotation of the input shaft. Typically the valve and toothed part of a power assisted steering gear are operatively mounted in a housing with the input shaft extending from a side of the housing for connection, usually, to a steering column. It has hitherto been proposed with such a typical arrangement for the toothed part to be rotatably borne in the housing by a rolling or other type bearing and it is an object of the present invention to provide an improved bearing arrangement for the toothed part which arrangement is of a relatively simple construction and convenient to assemble (particularly with the pinion part).

STATEMENT OF INVENTION AND ADVANTAGES

According to the present invention there is provided a power assisted steering gear comprising a toothed part having an axis about which it is rotatably mounted for driving an output member; a rotatably mounted input shaft co-axial with said toothed part; bearing means by which said toothed part is rotatably mounted in a housing; axially extending rod means which is co-axial with and couples together said input shaft and toothed part; valve means reacting between said toothed part and input shaft, said valve means being responsive to rotation of the input shaft for controlling flow of fluid under pressure to a servo motor associates with the output member to provide power assistance to displacement of that member, and wherein said toothed part is tubular with the rod means extending therethrough and an end of said rod means projects from the toothed part to provide a journal by which the toothed part is rotatably borne.

The invention envisages therefore the possibility of having an end of the rod means which couples together the toothed part and the input shaft in the form of a shaft which may be journalled, for example in a rolling or plane bearing, in the housing to rotatably mount the pinion part. This arrangement therefore alleviates the necessity of machining or otherwise forming a bearing surface or inner bearing race on the material of the pinion part and permits the journalled end of the rod means to be accurately machined for bearing purposes prior to assembly of the rod means with the pinion part. Furthermore, the rod means when inserted through the tubular toothed part and operatively coupled to both that part and the input shaft conveniently serves to maintain the toothed part and input shaft in a predetermined axial relationship relative to each other (especially in preventing those components from moving axially apart). The axial positioning of the toothed part relative to the rod means may conveniently be determined by providing on the end of the rod means which projects from the toothed part a shoulder which abuts the toothed part and is maintained in abutment therewith when the toothed part and input shaft are operatively positioned. Usually the rod means will be secured at one axially extending end region for rotation with the toothed part and at the other axially extending region for rotation with the input shaft. Pins may be used to secure the rod means for rotation with either or both the toothed part or the input shaft; more preferably however the rod means is secured for rotation with the toothed part by a tight splined engagement with that part so that said splines move into engagement as the rod means is passed axially through the tubular toothed part during assembly of the gear. The rod means will usually serve to maintain the toothed part, input shaft and valve means as a unified assembly for insertion into and removal from the housing in unit manner. With such a unified assembly (or even where the toothed part, valve means, input shaft and rod means are assembled piecemeal within the housing) the end of the rod means projecting from the toothed part may be engageable with bearing means mounted in the housing and within which bearing means the rod end is received and journalled during location of the toothed part within the housing. Alternatively the end of the rod means projecting from the toothed part may carry a rolling bearing which is located in an appropriate seating in the housing during location of the toothed part within the housing. This proposal therefore lends itself to a relatively fast and simple removal of the toothed part, valve means, rod means and input shaft as a unit from the housing for servicing or replacement purposes.

As previously mentioned the toothed part will usually be in the form of a pinion or worm the teeth of which are in driving engagement, within the housing, with a rack member or toothed sector which constitutes, or is coupled to, the output member to be driven in response to rotation of the input shaft.

The basic structure and operation of the valve means may be of a type which is conventional for power assisted steering gears whereby the input shaft and toothed part are capable of restricted rotation relative to each other and are rotationally biased relative to each other to oppose such restricted rotation and to a neutral condition of the valve means. With this arrangement the valve means may comprise first and second valve parts which are displaceable with respect to each other and in response to the aforementioned rotational displacement between the input shaft and the toothed part to control fluid flow through the valve means. The first and second valve parts can be displaceable with respect to each other axially and/or rotationally and with the latter form of rotational displacement one of the valve parts will usually rotate in unison with the toothed part while the other rotates in unison with the input shaft. The rotational biasing between the input shaft and the toothed part can be provided by a spring member which reacts between those components to resiliently bias the valve means to its neutral condition; such form of spring biasing will usually be provided where the rod means is in the nature of a rigid shaft or bar having its axially extending end regions coupled to the input shaft and the tubular toothed part so that these latter components are provided with a lost motion connection whereby they are capable of restricted rotation relative to each other on the rigid bar and against the spring biasing to effect the required displacement for the valve means. More usually however the rotational biasing between the input shaft and the toothed part will be provided by having the rod means of a resilient torque responsive nature. With this latter proposal and having one axially extending end region of the rod means secured for rotation with the toothed part and the other axially extending end region secured for rotation with the input shaft, relative rotation between the input shaft and toothed part effectively twists the rod means and the torsional forces developed thereby rotationally bias the components of the valve means to their neutral condition. These forms of rotational biasing between the input shaft and the toothed part are well known in the power assisted steering gear art.

DRAWINGS

One embodiment of a power assisted steering gear constructed in accordance with the present invention will now be described, by way of example only, with reference to the accompanying illustrative drawing which is an axial section through the gear showing the toothed part, valve means, input shaft and rod means and from which, for convenience, the output member together with other components conventionally associated with a power assisted steering gear have been omitted.

DETAILED DESCRIPTION OF DRAWING

The steering gear to which the drawing applies is of the rack and pinion type and has a pinion 1 rotatably mounted in a cavity 2 of a gear housing 3. The pinion 1 is rotated in response to rotation of an input shaft 4 about its axis 5 and with which input shaft the pinion 1 is co-axial. The teeth of the pinion 1 engage within the housing 3 with the teeth of a rack bar 1a (shown schematically in the drawings) which conveniently provides an output member of the steering gear and is displaceable longitudinally to effect a steering manoeuvre in response to rotation of the pinion.

The rack bar has associated therewith a servo motor 6a (such as a double acting piston and cylinder device, shown schematically) fluid pressure flow to which is intended to provide power assistance to displacement of the rack bar in the direction in which that bar is displaced by rotation of the pinion 1. The arrangement of the rack bar within the housing 3 and with respect to the pinion 1 and also the construction and arrangement of the servo motor may be conventional for power assisted steering gears and as such need not be discussed further.

Provided between the pinion 1 and the input shaft 4 is a fluid control valve 6 for controlling the flow of pressurized fluid to and from the aforementioned servo motor. The valve 6 is mounted within the cavity 2 and forms with the pinion 1 part of a unified assembly 7 carried by the input shaft 4

In constructing the unified assembly 7, the valve 6 has a valve sleeve 8 which extends co-axially from and is integral with the pinion 1. Co-axially received within the valve sleeve 8 is a valve core 9 formed on a tubular extension 10 of the input shaft 4. Interposed between the core 9 and valve sleeve 8 is a ported sleeve 11 within the bore of which the valve core 9 is slidably received and which ported sleeve 11 is secured relative to the valve sleeve 8. Extending axially through the unified assembly 7 is a torque responsive rod 12 which is coupled at one end region by a pin 13 to the input shaft 4 for rotation with that shaft and is coupled at its other end region by co-operating splines 14 to the pinion 1 for rotation with the pinion.

For convenience the porting and passage arrangements for fluid flow control within the valve 6 have been omitted, suffice it to say that these arrangements may be of a type which is conventional for power assisted steering gears incorporating valves in which relative rotation between valve components from a neutral condition of the valve causes an adjustment in the porting to provide the required fluid flow to the servo motor associated with the output member for the power assistance to be applied. In the present embodiment adjustment of the porting in the valve 6 is effected by relative rotation between the valve core 9 and the combined valve sleeves 8 and 11. To provide such adjustment in the porting as aforementioned when the input shaft 4 is rotated in response to a steering input, if the rack bar is under load (so that the pinion 1 is restrained from rotating, through the rod 12, in unison with the input shaft) the resilience of the rod 12 and the torsional forces to which it is subjected between the input shaft and the pinion causes the rod 12 to twist and this to be reflected in relative rotation between the valve core 9 and the valve sleeves 8, 11 to provide the required fluid flow control in conventional manner.

To maintain the gear of a compact nature, the cavity 2 within which the unified assembly 7 is mounted has a stepped bore within a smaller diameter bore part 2a of which is received the pinion 1 and within the larger diameter bore part 2b of which is received the valve 6. The external cylindrical face of the valve sleeve 8 is received as a close sliding and sealed fit within the bore part 2b and this bore part opens into a further enlarged bore part 2c which communicates with a side port 15 in the housing 3 (from which side port the input shaft 4 extends).

The unified assembly 7 is rotatably mounted within the housing 3 by a needle roller bearing 16 and a ball roller bearing 17. The needle bearing 16 is mounted in a bore 18 extending from the cavity 2 and a shaft part 19 extending axially from the pinion 1 is journalled therein. The shaft part 19 is formed by an end of the rod 12 which projects through the tubular pinion 1 as shown. The ball bearing 17 has an inner face formed by part of the valve sleeve 8 and an outer race formed by a bearing sleeve 20 which is non-rotatably received within the bore part 2c of the housing. Mounted within the outer race sleeve 20 and secured relative thereto is an annular fluid seal 21 extending between that race and the tubular input shaft part 10. The seal 21 slidably engages the shaft part 10 to permit relative axial rotation therebetween and is retained in fluid sealing engagement with the shaft part by a light annular spring 22. The seal 21 is retained by an annular closure plate 23 mounted on a rebated end of the bearing sleeve 20 and through which plate 23 the input shaft 4 projects from the housing 3 for connection to a steering column.

An annular fluid seal 24 seated in the shoulder formed between the larger and smaller cavity bore parts 2a and 2b slidably engages the unified assembly 7 to provide a seal between the cavity part within which the pinion is located and that within which the valve is located.

The unified assembly 7 which, in the present example includes the ball bearing 17 and its outer race sleeve 20, is retained within the cavity 2 solely by means of a "C" shaped spring clip 25 which is removably received within an annular recess in the bore part 2c and within the side port 15 to be readily accessible from the exterior of the gear housing. The clip 25 abuts and retains the plate 23 and bearing race sleeve 20 to secure the latter sleeve against an annular shoulder formed between the bore parts 2b and 2c (this retention of the sleeve 20 conveniently determines the axial location of the unified assembly 7 within the housing 3).

Removal of the unified assembly 7 from the housing 3 for servicing or replacement purposes can be effected in a most simple and convenient manner by disengaging the clip 25 and withdrawing the assembly as a unit (including the sleeve 20) from the cavity 2 axially through the side port 15. During this removal the needle bearing 16 and seal 24 are retained in their respective seatings within the housing 3 but can be subsequently replaced, if necessary. The unified assembly after servicing (or another assembly with different characteristics for the valve and/or pinion) is easily and simply positioned within the gear by insertion through the side port 15 with the journalled shaft 19 leading sequentially, the pinion 1 and valve 6 until the shaft 19 engages within the needle bearing 16, the bearing race 20 is correctly seated within the bore part 2c and the retaining clip 25 can be fitted to secure the assembly 7 within the housing.

In accordance with conventional practice the unified assembly includes a fail-safe arrangement which permits manual operation of the gear in the event of a malfunction in the power assistance facility. This fail-safe arrangement is provided by the end 26 of the tubular input shaft which is adjacent to the pinion 1 having an external profile which is other than cylindrical, for example substantially rectangular, and being received, with clearance, within a socket 27 of the pinion. The socket 27 is also of non-cylindrical profile, for example rectangular. The clearance between the parts 26 and 27 is such that it permits limited relative rotation between the input shaft part 10 and the valve sleeve 8 for the required operation of the valve 6 but, in the event of power assistance malfunction, the parts 26 and 27 move into abutment with each other during relative rotation between the shaft 10 and sleeve 8 for the pinion to be rotated directly and in unison with the input shaft 4.

The assembly 7 is constructed prior to its location in the housing 3 and such construction may be achieved simply and conveniently by virtue of the tubular pinion 1 and rod 12 proposal. The rod 12 is passed through the pinion 1 (and its sleeve 8) until the splines 14 interengage as a tight or interference fit and an annular shoulder 19a formed on the shaft part 19 abuts the end of the pinion 1 to determine the relative axial positioning between the pinion and the rod. The tubular extension 10 of the input shaft is now passed over the rod 12 to assemble the valve 6 and the end of the rod is pinned at 13 to the input shaft to complete the assembly 7 (subject to the fitting of the necessary seals, clips and bearing arrangement 17). It will be apparent that when the rod 12 is pinned to the input shaft 4 it maintains the pinion 1 and input shaft 4 in a predetermined axial relationship relative to each other (which relationship is consistant with the required operation of the valve 6).

We claim:

1. A power assisted steering gear comprising a toothed part having an axis about which it is rotatably mounted for driving an output member, a rotatably mounted input shaft coaxial with said toothed part, bearing means by which said toothed part is rotatably mounted in a housing, axially extending rod means which is coaxial with and couples together said input shaft and toothed part, valve means reacting between said toothed part and input shaft, said valve means being responsive to rotation of the input shaft for controlling flow of fluid under pressure to a servo motor associated with the output member to provide power assistance to displacement of that member, said toothed part being tubular with the rod means extending therethrough, and said rod means having an end projecting axially from the toothed part to provide a journal by which the toothed part is rotatably borne, said end projecting from the toothed part being engageable with said bearing means during location of said tooth part within the housing.

2. A gear as claimed in claim 1 in which the rod means is secured at one axially extending end region thereof for rotation with the toothed part and at the other axially extending end region for rotation with the input shaft.

3. A gear as claimed in claim 1 in which the rod means is secured for rotation with the toothed part by splined engagement between said means and the toothed part.

4. A gear as claimed in claim 1 in which the rod means maintains the toothed part and input shaft in a predetermined axial relationship relative to each other.

5. A gear as claimed in claim 1 in which the end of said rod means which projects from the toothed part has a shoulder which abuts said toothed part and is maintained in said abutment to determine the axial positioning of the toothed part relative to said rod means.

6. A gear as claimed in claim 1 in which the end of said rod means projecting from the toothed part is journalled in a rolling bearing mounted in said housing.

7. A gear as claimed in claim 1 in which the rod means maintains the toothed part, input shaft and valve means as a unified assembly for insertion into and removal from the housing as a unit.

8. A gear as claimed in claim 1 in which the input shaft and toothed part are capable of restricted rotation relative to each other and are rotationally biased relative to each other to oppose said restricted rotation and to a neutral condition of the valve means and wherein the valve means comprises first and second valve parts which are displaceable with respect to each other and in response to said rotational displacement between the input shaft and the toothed part to control fluid flow through the valve means.

9. A gear as claimed in claim 8 in which the first and second valve parts are rotationally displaceable, one in unison with the toothed part and the other in unison with the input shaft.

10. A gear as claimed in claim 9 in which the first and second valve parts comprise a valve core and a valve sleeve within which the core is rotatably received.

11. A gear as claimed in claim 10 in which the valve sleeve is integral with the toothed part.

12. A gear as claimed in claim 8 in which said rod means is resiliently torque responsive and provides said rotational biasing between the input shaft and the toothed part.

13. A gear as claimed in claim 1 in which the toothed part comprises a pinion.

* * * * *